United States Patent
Bruno

(10) Patent No.: US 10,543,924 B2
(45) Date of Patent: Jan. 28, 2020

(54) ENVIRONMENTAL CONTROL SYSTEM UTILIZING MULTIPLE MIX POINTS FOR RECIRCULATION AIR IN ACCORDANCE WITH PRESSURE MODE

(71) Applicant: Hamilton Sundstrand Corporation, Windsor Locks, CT (US)

(72) Inventor: Louis J. Bruno, Ellington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 399 days.

(21) Appl. No.: 15/136,261

(22) Filed: Apr. 22, 2016

(65) Prior Publication Data

US 2017/0305557 A1    Oct. 26, 2017

(51) Int. Cl.
*B64D 13/06*   (2006.01)
*F25B 9/00*    (2006.01)
*F25B 9/10*    (2006.01)

(52) U.S. Cl.
CPC .............. *B64D 13/06* (2013.01); *F25B 9/004* (2013.01); *F25B 9/10* (2013.01); *B64D 2013/0618* (2013.01); *B64D 2013/0644* (2013.01); *B64D 2013/0648* (2013.01); *B64D 2013/0688* (2013.01); *F25B 2600/2515* (2013.01); *Y02T 50/56* (2013.01)

(58) Field of Classification Search
CPC ............ B64D 13/06; B64D 2013/0688; B64D 2013/0648; B64D 2013/0644; B64D 2013/0618; Y02T 50/56; F25B 9/004; F25B 9/10; F25B 2600/2515

USPC ........................................................... 62/402
See application file for complete search history.

(56) References Cited

U.S. PATENT DOCUMENTS

| | | | | |
|---|---|---|---|---|
| 3,711,044 A | * | 1/1973 | Matulich | B64D 13/06 165/212 |
| 4,209,993 A | * | 7/1980 | Rannenberg | B60H 1/32 62/239 |
| 4,261,416 A | | 4/1981 | Hamamoto | |
| 4,445,342 A | * | 5/1984 | Warner | B64D 13/06 236/13 |
| 5,086,622 A | * | 2/1992 | Warner | B64D 13/06 62/172 |
| 5,461,882 A | * | 10/1995 | Zywiak | B60H 1/00007 62/401 |
| 6,519,969 B2 | | 2/2003 | Sauterleute | |
| 6,883,335 B2 | | 4/2005 | Axe et al. | |
| 7,797,962 B2 | | 9/2010 | Kresser et al. | |
| 7,970,497 B2 | | 6/2011 | Derouineau | |
| 8,099,973 B2 | | 1/2012 | Sampson et al. | |
| 9,205,925 B2 | | 12/2015 | Bruno et al. | |
| 9,211,954 B2 | | 12/2015 | Barkowsky | |

(Continued)

OTHER PUBLICATIONS

Search Report dated Sep. 21, 2017 in EP Application No. 17167632. 3, 9 pages.

*Primary Examiner* — Brian M King
(74) *Attorney, Agent, or Firm* — Cantor Colburn LLP

(57) ABSTRACT

A system is provided. The system includes an air conditioning pack; a first medium; a second medium; a first mixing point located outside the air conditioning pack and configured to mix the first medium with the second medium; and a second mixing point located inside the air conditioning pack and configured to mix the first medium with the second medium.

11 Claims, 6 Drawing Sheets

(56) References Cited

U.S. PATENT DOCUMENTS

| | | |
|---|---|---|
| 2008/0264084 A1 | 10/2008 | Derouineau et al. |
| 2010/0323601 A1 | 12/2010 | Cremers et al. |
| 2013/0061611 A1* | 3/2013 | Dittmar .................. B64D 13/00 62/56 |
| 2015/0065025 A1 | 3/2015 | Bruno et al. |
| 2015/0246729 A1 | 9/2015 | Ng |
| 2015/0251765 A1* | 9/2015 | Jonqueres .............. B64D 13/08 62/86 |

* cited by examiner

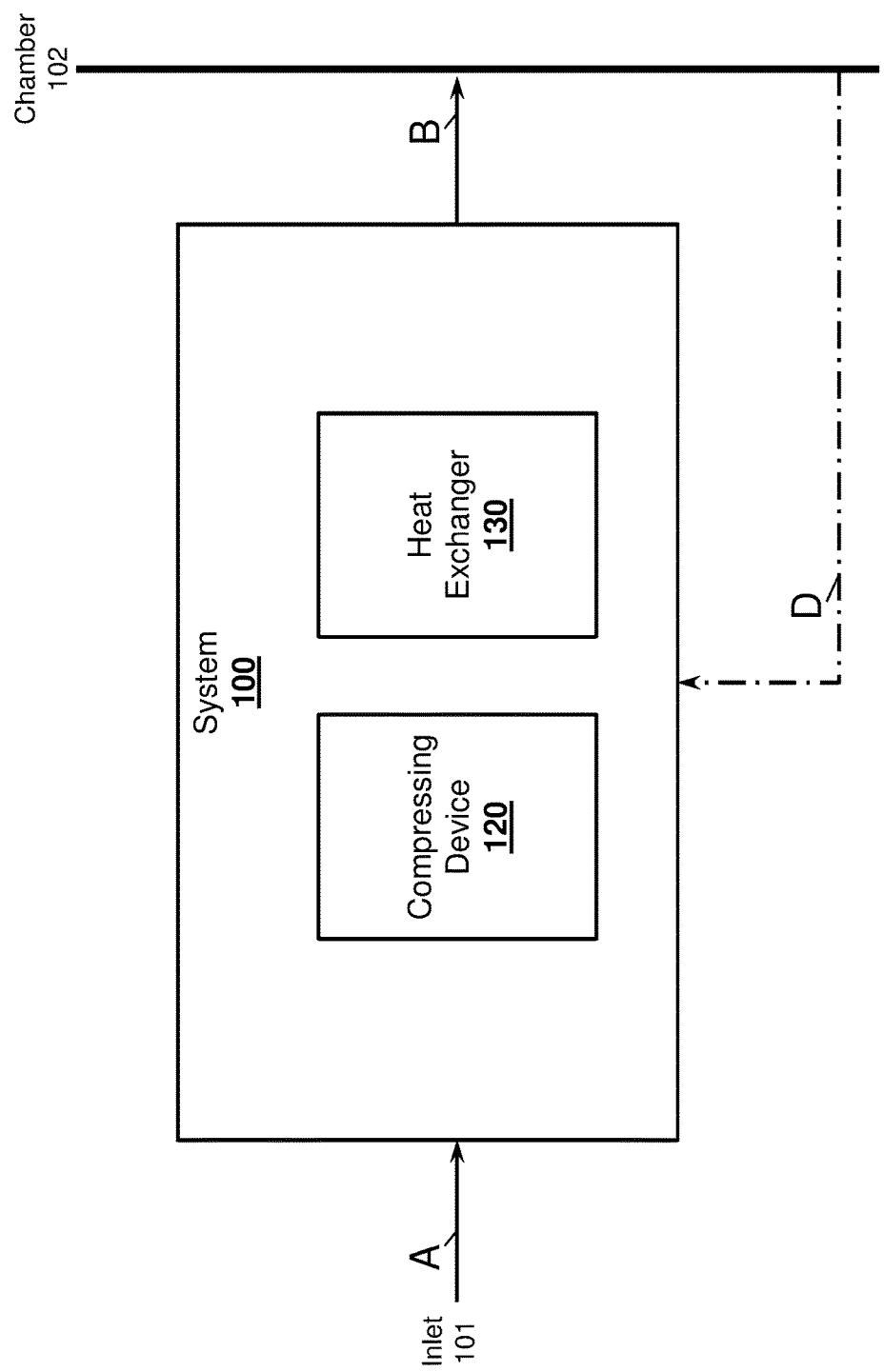

ENVIRONMENTAL CONTROL SYSTEM UTILIZING MULTIPLE MIX POINTS FOR RECIRCULATION AIR IN ACCORDANCE WITH PRESSURE MODE

BACKGROUND

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

SUMMARY

According to one embodiment, a system is provided. The system includes an air conditioning pack; a first medium; a second medium; a first mixing point located outside the air conditioning pack and configured to mix the first medium with the second medium; and a second mixing point located inside the air conditioning pack and configured to mix the first medium with the second medium.

Additional features and advantages are realized through the techniques of the embodiments herein. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1A is a diagram of an schematic of an environmental control system according to an embodiment;

DETAILED DESCRIPTION OF THE INVENTION

Figure 1B:
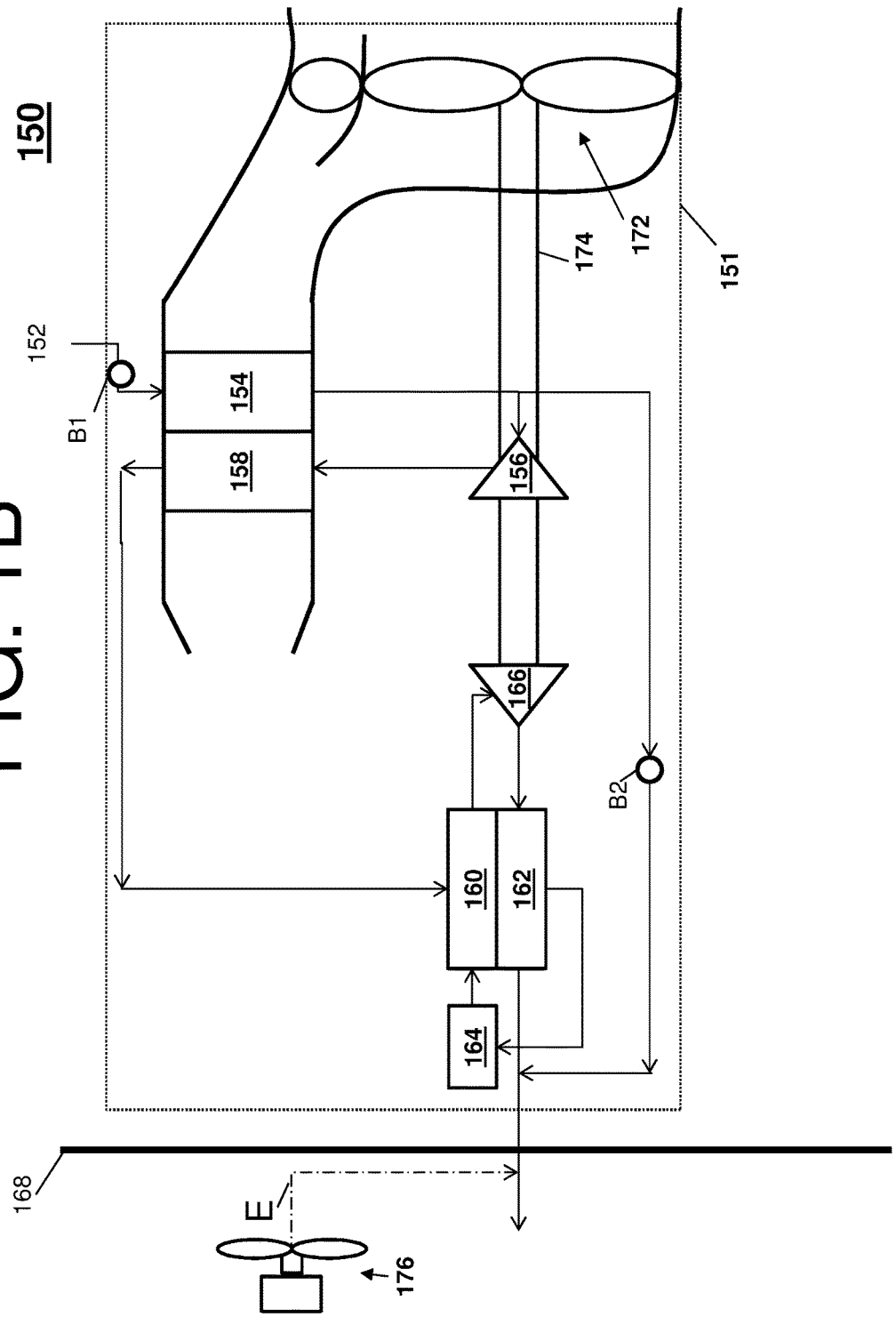
FIG. 1B is a diagram of an schematic of a conventional bleed air driven environmental control system of an airplane utilizing a contemporary cabin three-wheel air conditioning system.

A detailed description of one or more embodiments of the disclosed apparatus and method are presented herein by way of exemplification and not limitation with reference to the FIGS.

Embodiments herein provide an environmental control system that utilizes bleed pressures near a cabin pressure to power the environmental control system, along with mixing recirculation air mixed at different locations within the environmental control system in accordance with a pressure mode, to provide cabin pressurization and cooling at a high engine fuel burn efficiency.

In general, embodiments of the environmental control system may include one or more heat exchangers and a compressing device. A medium, bled from a low-pressure location of an engine, flows through the one or more heat exchangers into a chamber. Turning now to FIG. 1A, a system 100 that receives a medium from an inlet 101 and provides a conditioned form of the medium to a chamber 102 is illustrated. The system 100 comprises a compressing device 120 and a heat exchanger 130. The elements of the system are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1A, a medium can flow from an inlet 101 through the system 100 to a chamber 102, as indicated by solid-lined arrows A, B. In the system 100, the medium can flow through the compressing device 120, through the heat exchanger 130, from the compressing device 120 to the heat exchanger 130, from the heat exchanger 130 to the compressing device 120, etc. Further, the medium can recirculate from the chamber 102 to the system 100, as indicated by the dot-dashed lined arrow D (and can then flow back to the chamber 102 and/or external to the system 100).

The medium, in general, can be air, while other examples include gases, liquids, fluidized solids, or slurries. When the medium is being provided from the chamber 102 of the system 100, the medium is referred to herein as recirculated air. When the medium is being provided by an engine connected to the system 100, such as from the inlet 101, the medium can be referred to herein as bleed air (also known as fresh air or outside air). With respect to bleed air, a low-pressure location of the engine (or an auxiliary power unit) can be utilized to provide the medium at an initial pressure level near a pressure of the medium once it is in the chamber 102 (e.g., chamber pressure, also referred to as cabin pressure in the aircraft example).

For instance, continuing with the aircraft example above, air can be supplied to the environmental control system by being "bled" from a compressor stage of a turbine engine. The temperature, humidity, and pressure of this bleed air varies widely depending upon a compressor stage and a revolutions per minute of the turbine engine. Since a low-pressure location of the engine is utilized, the air may be slightly above or slightly below cabin pressure (e.g., the pressure in the chamber 102). Bleeding the air at such a low pressure from the low-pressure location causes less of a fuel burn than bleeding air from a higher pressure location. Yet, because the air is starting at this relatively low initial pressure level and because a drop in pressure occurs over the one or more heat exchangers, a pressure of the air may drop below the cabin pressure while the air is flowing through the heat exchanger 130. When the pressure of the air is below the cabin pressure, the air will not flow into the chamber to provide pressurization and temperature conditioning. To achieve the desired pressure, the bleed-air can be compressed as it is passed through the compressing device 120.

The compressing device 120 is a mechanical device that controls and manipulates the medium (e.g., increasing the pressure of bleed air). Examples of a compressing device 120 include an air cycle machine, a three-wheel machine, a four wheel-machine, etc. The compressing can include a compressor, such as a centrifugal, a diagonal or mixed-flow, axial-flow, reciprocating, ionic liquid piston, rotary screw, rotary vane, scroll, diaphragm, air bubble compressors, etc. Further, compressors can be driven by a motor or the medium (e.g., bleed air, chamber discharge air, and/or recirculation air) via a turbine.

The heat exchanger 130 is a device built for efficient heat transfer from one medium to another. Examples of heat exchangers include double pipe, shell and tube, plate, plate and shell, adiabatic wheel, plate fin, pillow plate, and fluid heat exchangers., air forced by a fan (e.g., via push or pull methods) can be blown across the heat exchanger at a variable cooling airflow to control a final air temperature of the bleed air.

Figure 2:
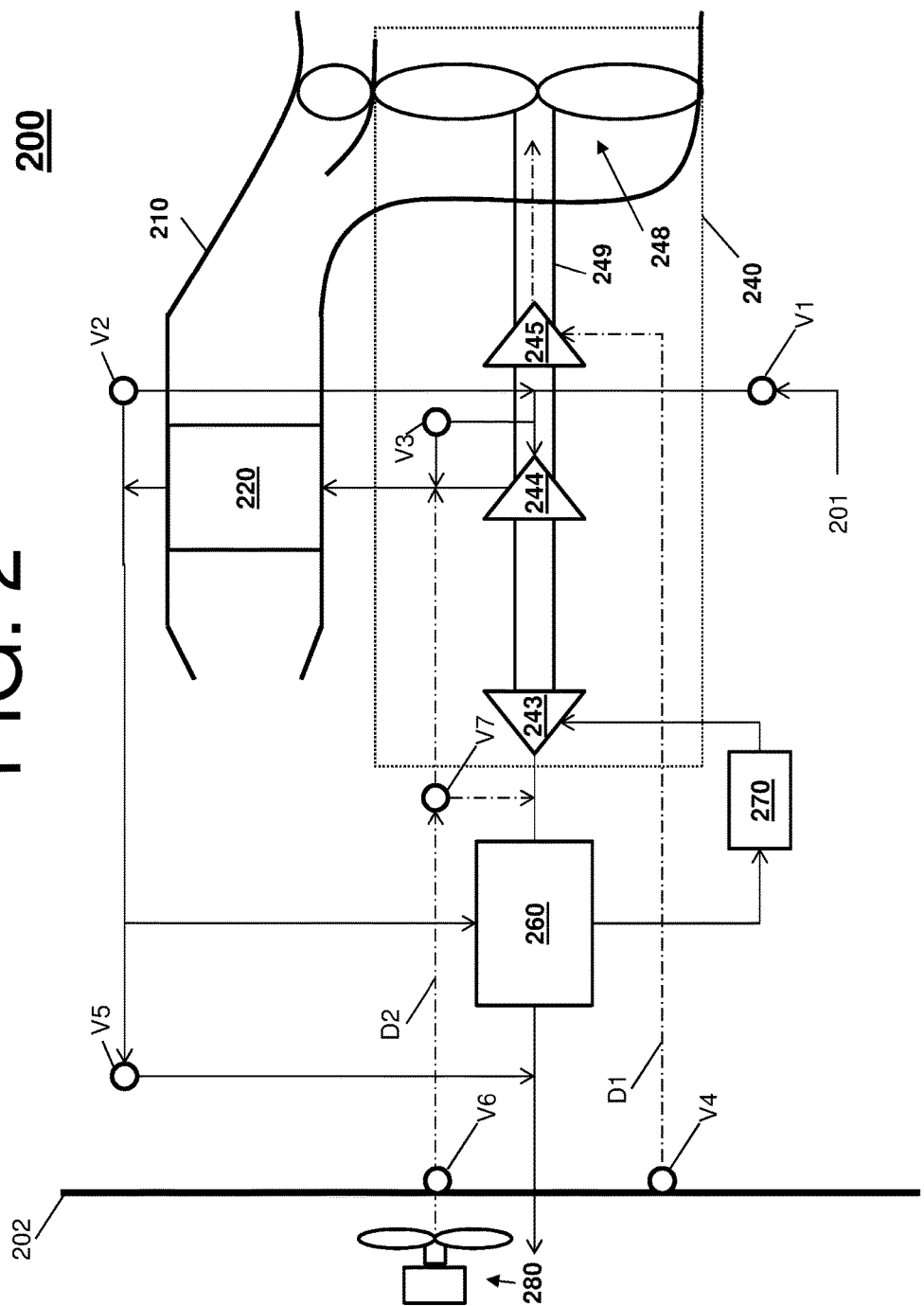
FIG. 2 is operation example of an environmental control system according to an embodiment.

The system 100 of FIG. 1A will now be described with reference to FIG. 1B and FIG. 2, in view of the aircraft example. FIG. 1B is a diagram of an schematic of a conventional bleed air driven environmental control system 150 of an airplane utilizing a contemporary cabin three-wheel air conditioning system 151. FIG. 2 depicts a schematic of a system 200 (e.g., an embodiment of system 100) as it could be installed on an aircraft.

The conventional bleed air driven environmental control system 150 illustrates valves B1-V2, an inlet 152, a primary heat exchanger 154, a centrifugal compressor 156, a secondary heat exchanger 158, a condenser 160, a water extractor 162, a reheater 164, a turbine 166, a cabin 168, a fan 172, a shaft 174, and a fan 176, each of which can be connected via tubes, pipes, and the like. Note that the contemporary cabin three-wheel air conditioning system 151, also known as an air conditioning pack or a pack, includes components that are performing thermodynamic work, such as the centrifugal compressor 156, the heat exchangers 154, 158, the condenser 160, the water extractor 162, the reheater 164, and the turbine 166. The pack can also begin at a mass flow control valve B1 and conclude as air exits the condenser 162.

The system 200 will now be describe with respect to a conventional bleed air driven environmental control system 150 of the airplane utilizing a contemporary cabin three-wheel air conditioning system 151. The conventional bleed air driven air environmental control system 150 receives bleed air at a pressure between 30 psia (e.g., during cruise) and 45 psia (e.g., on the ground) through the mass flow control valve B1. In the conventional bleed air driven air environmental control system 150, during hot day ground operation, the centrifugal compressor 156 of the contemporary cabin three-wheel air conditioning system 151 receives nearly all of the flow of the bleed air at a pressure of approximately 45 psia. Further, during hot day cruise operation, the centrifugal compressor 156 of the contemporary cabin three-wheel air conditioning system 151 receives only a portion of the flow of the bleed air at a pressure of 30 psia. The remainder of the bleed air bypasses the centrifugal compressor 156 via a bypass valve B2 and is sent to the cabin 168. In addition, the conventional bleed air driven air environmental control system 150 can mix hot moist recirculation air E (represented by the dot-dashed line) with cold dry outside air downstream of the conventional bleed air driven environmental control system 150 in the cabin 168. This cool mixture is then used to condition the airplane's cabin and flight deck (i.e., the cabin 168 is supplied a bulk average temperature of the mixed streams). Note that the outlet temperature of the contemporary cabin three-wheel air conditioning system 151 is driven well below the mix temperature because it needs to cool the recirculation air. In the conventional bleed air driven environmental control system, driving the outlet temperature as described is achieved by a combination of ram air cooling of the outside air and pressure expansion across a turbine of the contemporary cabin three-wheel air conditioning system 151. As a result, the conventional bleed air driven environmental control system typically requires 30 psia at its inlet. This requirement is in contrast to providing cabin pressurization and cooling at a high engine fuel burn efficiency, as the conventional bleed air driven environmental control system cannot utilize pressures near cabin pressure at the inlet of the contemporary cabin three-wheel air conditioning system 151.

In contrast to the conventional bleed air driven environmental control system utilizing the contemporary cabin three-wheel air conditioning system 151, the system 200 is an example of an environmental control system of an aircraft that provides air supply, thermal control, and cabin pressurization for the crew and passengers of the aircraft at a high engine fuel burn efficiency. The system 200 illustrates bleed air flowing in at inlet 201 (e.g., off an engine of an aircraft at an initial flow rate, pressure, temperature, and humidity), which in turn is provided to a chamber 202 (e.g., cabin, flight deck, pressurized volume, etc.) at a final flow rate, pressure, temperature, and humidity. The bleed air can recirculate back through the system 200 from the chamber 202 (herein cabin discharge air and recirculated air are represented by the dot-dashed lines D1 and D2, respectively) to drive and/or assist the system 200.

The system in includes a shell 210 for receiving and directing ram air through the system 200. Note that based on the embodiment, an exhaust from the system 200 can be sent to an outlet (e.g., releases to ambient air through the shell 210). Note also that the system 200 can work with bleed pressures near a chamber pressure during cruise.

The system 200 further illustrates valves V1-V7, a heat exchanger 220, an air cycle machine 240 (that includes a turbine 243, a compressor 244, a turbine 245, a fan 248, and a shaft 249), a condenser 260, a water extractor 270, and a recirculation fan 280, each of which is connected via tubes, pipes, and the like. Note that the heat exchanger 220 is an example of the heat exchanger 130 as described above. Further, in an embodiment, the heat exchanger 220 is a secondary heat exchanger that is downstream of a primary heat exchanger (not shown). Note also that the air cycle machine 240 is an example of the compressing device 120 as described above.

The air cycle machine 240 extracts or works on the medium by raising and/or lowering pressure and by raising and/or lowering temperature. The compressor 244 is a mechanical device that raises the pressure of the bleed-air received from the inlet 201. The turbines 243, 245 are mechanical devices that drive the compressor 244 and the fan 248 via the shaft 249. The fan 248 is a mechanical device that can force via push or pull methods air through the shell 210 across the secondary heat exchanger 220 at a variable cooling airflow. Thus, the turbines 243, 245, the compressor 244, and the fan 248 together illustrate, for example, that the air cycle machine 240 may operate as a four-wheel air cycle machine that utilizes air recirculated or discharged from the chamber 202 (e.g., in an embodiment, the air cycle machine 240 utilizes chamber discharge air to perform compressing operations, as indicated by the dot-dashed line D1).

The condenser 260 is particular type of heat exchanger. The water extractor 270 is a mechanical device that performs a process of taking water from any source, such as bleed-air. The recirculation fan 280 is a mechanical device that can force via a push method recirculation air into the system 200, as indicated by dot-dashed arrow D2.

In a high pressure mode of operation of the system 200, high-pressure high-temperature air is received from the inlet 201 through the valve V1 (mass flow control valve). The high-pressure high-temperature air enters the compressor 244. The compressor 244 pressurizes the high-pressure high-temperature and in the process heats it. This air then enters the heat exchanger 220 and is cooled by ram air to produce cool high pressure air (e.g., at approximately ambient temperature). This cool high pressure air enters into the condenser 260 and the water extractor 270, where the air is cooled and the moisture removed. The cool high pressure air enters the turbine 243, where it is expanded and work extracted. The work from the turbine 243 can drive both the compressor 244 and the fan 248. The fan 248 is used to pull a ram air flow through the heat exchanger 220. Also, by expanding and extracting work on the cool high pressure air, the turbine 243 produces cold bleed air. After leaving the turbine 243, the cold bleed air is mixed at a mixing point with recirculation air D2 provided by the fan 280 through the valves V6 and V7. The mixing point in this case can be referred to as downstream of the compressing device 240, downstream of the compressor 244, downstream of the turbine 243, and/or upstream a low pressure side of the condenser 260. When applied to an air conditioning pack, the mixing point can be referred to as inside the pack. By mixing the cold bleed air with the recirculation air, the system 200 utilizes the recirculation air, which is warm and moist, to level out the cold bleed air (e.g., raise the temperature). This leveled out bleed air, in turn, enters a low pressure side of the condenser 260, cools the bleed air on the high pressure side of the condenser 260, and is sent to condition the chamber 202.

Note that when operating in the high pressure mode, it is possible for the air leaving the compressor 244 to exceed an auto-ignition temperature of fuel (e.g., 400 F for steady state and 450 F for transient). In this situation, air from an outlet of the heat exchanger 220 is ducted by the valve V2 to an inlet of the compressor 244. This lowers an inlet temperature of the air entering the inlet of the compressor 244 and, as a result, the air leaving the compressor 244 is below the auto-ignition temperature of fuel.

The high pressure mode of operation can be used at flight conditions when engine pressure is adequate to drive the cycle or when a temperature of the chamber 202 demands it. For example, conditions, such as ground idle, taxi, take-off, climb, and hold conditions would have the air cycle machine 240 operating in the high pressure mode. In addition, extreme temperature high altitude cruise conditions could result in the air cycle machine 240 operating in the high pressure mode.

In a low pressure mode of operation, the bleed air from the inlet 201 bypasses the air cycle machine 240 via the valve V3 and mixes at a mixing point with the recirculation air D2 provided by the fan 280 through the valves V6 and V7 to produce mixed air. The mixing point in this case can be referred to as downstream of the compressor 244 and/or upstream of the heat exchanger 220. When applied to an air conditioning pack, the mixing point can be referred to as inside the pack. The mixed air goes directly through the heat exchanger 220, where it is cooled by ram air to the temperature required by the chamber 202, to produce cool air.

The cool air then goes directly into the chamber 202 via the valve V5. Further, the chamber discharge air D1 is used to keep the air cycle machine 240 turning at a minimum speed. That is, chamber discharge air D1 flowing from the chamber 202 through the valve V4 enters and expands across the turbine 245, so that work is extracted. This work is utilized to turn the air cycle machine 240 at, for example, a minimum speed of approximately 6000 rpm. The air exiting the turbine 245 is then dumped overboard through the shell 210.

The low pressure mode can be used at flight conditions where the pressure of the bleed air entering the air cycle machine 240 is greater than approximately 1 psi above the chamber pressure (e.g., conditions at cruise where altitudes are above 30,000 ft. and conditions at or near standard ambient day types).

In a boost pressure mode of operation, the bleed air from the inlet 201 enters the compressor 244, where it is compressed and heated. The compressed and heated air from the compressor 244 mixes at a mixing point with the recirculation air D2 provided by the fan 280 through the valves V6 and V7 to produce mixed air. The mixing point in this case can be referred to as downstream of the compressor 244 and/or upstream of the heat exchanger 220. When applied to an air conditioning pack, the mixing point can be referred to as inside the pack. The mixed air enters the heat exchanger 220, where it is cooled by ram air to the temperature required by the chamber 202 to produce cool air. The cool air then goes directly into the chamber 202 via the valve V5. Further, the cabin discharge air D1 is used to provide the energy to pressurize the bleed air entering the compressor 244. That is, the chamber discharge air D1 flowing from the chamber 202 through valves the V4 enters and expands across the turbine 245, so that work is extracted. The amount of work extracted by the turbine 245 is enough to turn the air cycle machine 240 at the speed required by the compressor 244 to raise a pressure of the bleed air to a value that can drive the bleed air through the heat exchanger 220 and into the chamber 202.

The boost pressure mode can be used at flight conditions where the pressure of the bleed air entering the air cycle machine 240 is as low as 2.5 psi below the chamber pressure (e.g., conditions at cruise where altitudes are above 30,000 ft. and conditions at or near standard ambient day types).

Figure 3:
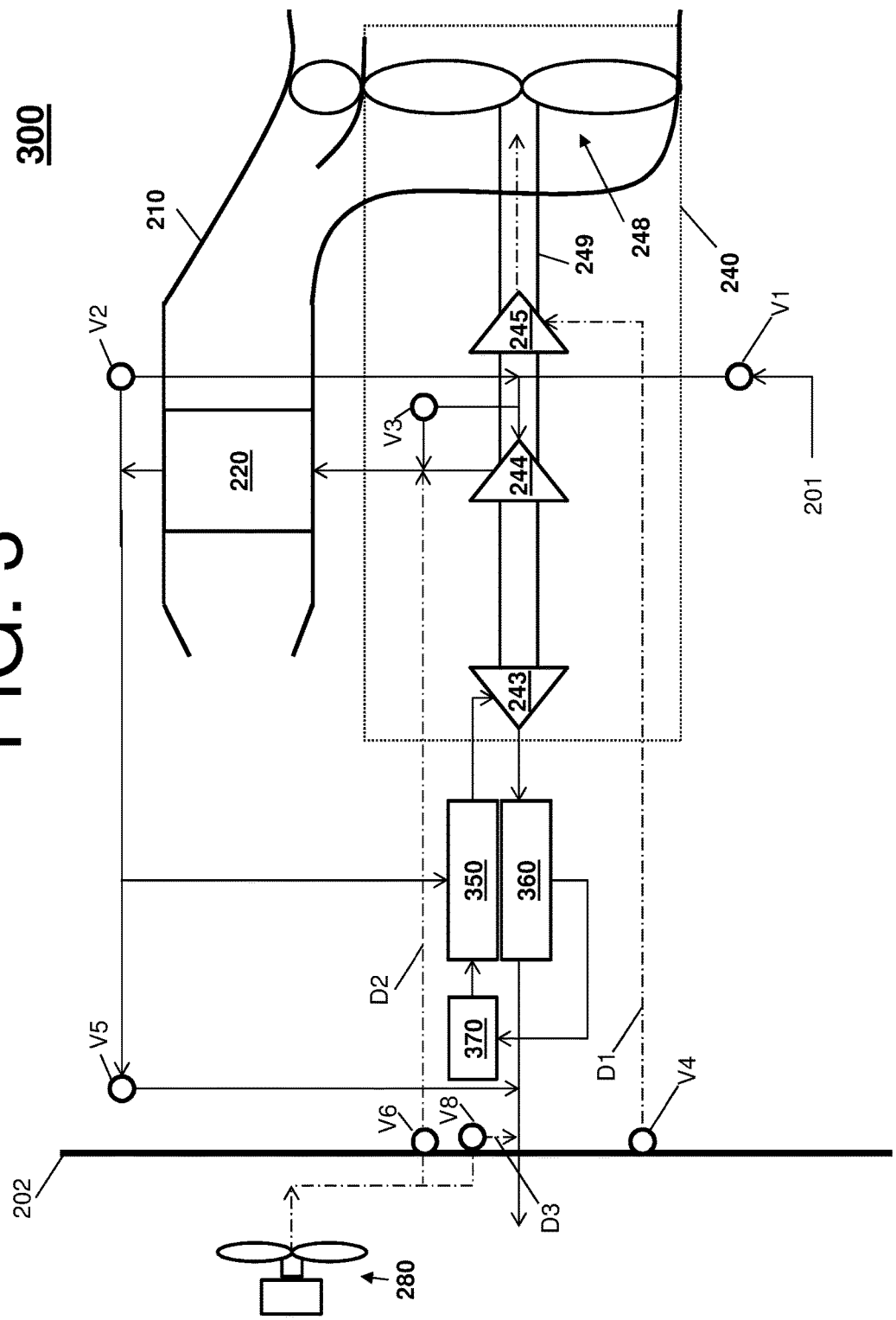
FIG. 3 is operation example of an environmental control system according to another embodiment.

The system 100 of FIG. 1A will now be described with reference to FIG. 3, in view of the aircraft example. FIG. 3 depicts a schematic of a system 300 (e.g., an embodiment of system 100) as it could be installed on an aircraft. Components of the system 300 that are similar to the system 200 have been reused for ease of explanation, by using the same identifiers, and are not re-introduced. Alternative components of the system 300 include a valve V8, a reheater 350, a condenser 360, and a water extractor 370, along with an alternative path for the recirculation air denoted by the dot-dashed line D3.

The reheater 350 and the condenser 360 are particular types of heat exchanger. The water extractor 370 is a mechanical device that performs a process of taking water from any source, such as bleed-air. Together, reheater 350, the condenser 360, and/or the water extractor 370 can combine to be a high pressure water separator.

In a high pressure mode of operation, high-pressure high-temperature air is received from the inlet 201 through the valve V1. The high-pressure high-temperature air enters the compressor 244. The compressor 244 pressurizes the high-pressure high-temperature and in the process heats it. This air then enters the heat exchanger 220 and is cooled by ram air to produce cool high pressure air (e.g., at approximately ambient temperature). This cool high pressure air enters into the reheater 350, where it is cooled; through the condenser 360, where it is cooled by air from the turbine 243; through the water extractor 370, where the moisture in the air is removed; and again into the reheater 350, where the air is heated to nearly an inlet temperature at the reheater 350. The warm high pressure and now dry air enters the turbine 243, where it is expanded and work extracted. The work from the turbine 243 can drive both the compressor 244 and the fan 248. The fan 248 is used to pull ram air flow through the heat exchanger 220. After leaving the turbine 243, the cold air, typically below freezing, cools the warm moist air in the condenser 360. Downstream of the condenser 360, the cold air leaving the air cycle machine 240 mixes at a mixing point with the recirculation air D3 provided by the fan 280 through the valve V8 to produce mixed air. The mixing point in this case can be referred to as downstream of the compressing device 240, downstream of the compressor 244, and/or downstream of the turbine 243. When applied to an air conditioning pack, the mixing point can be referred to as outside the pack. This mixed air then sent to condition the chamber 202.

When operating in the high pressure mode, it is possible for the air leaving the compressor 244 to exceed an auto-ignition temperature of fuel (e.g., 400 F for steady state and 450 F for transient). In this situation, air from an outlet of the first pass of the heat exchanger 220 is ducted by the valve V2 to an inlet of the compressor 244. This lowers an inlet temperature of the air entering the inlet of the compressor 244 and, as a result, the air leaving the compressor 244 is below the auto-ignition temperature of fuel.

The high pressure mode of operation can be used at flight conditions when engine pressure is adequate to drive the cycle or when a temperature of the chamber 202 demands it. For example, conditions, such as ground idle, taxi, take-off, climb, and hold conditions would have the air cycle machine 240 operating in the high pressure mode. In addition, extreme temperature high altitude cruise conditions could result in the air cycle machine 240 operating in the high pressure mode.

In a low pressure mode of operation, the bleed air from the inlet 201 bypasses the air cycle machine 240 via the valve V3 and mixes at a mixing point with the recirculation air D2 provided by the fan 280 through the valve V6 to produce mixed air. The mixing point in this case can be referred to as downstream of the compressor 244 and/or upstream of the heat exchanger 220. When applied to an air conditioning pack, the mixing point can be referred to as inside the pack. The mixed air goes directly through the heat exchanger 220, where it is cooled by ram air to the temperature required by the chamber 202 to produce cool air. The cool air then goes directly into the chamber 202 via the valve V5. Further, the chamber discharge air D1 is used to keep the air cycle machine 240 turning at a minimum speed. That is, chamber discharge air D1 flowing from the chamber 202 through the valve V4 enters and expands across the turbine 245, so that work is extracted. This work is utilized to turn the air cycle machine 240 at, for example, a minimum speed of approximately 6000 rpm. The air exiting the turbine 245 is then dumped overboard through the shell 210.

The low pressure mode can be used at flight conditions where the pressure of the bleed air entering the air cycle machine 240 is greater than approximately 1 psi above the chamber pressure (e.g., conditions at cruise where altitudes are above 30,000 ft. and conditions at or near standard ambient day types).

In a boost pressure mode of operation, the bleed air from the inlet 201 enters the compressor 244, where it is compressed and heated. The compressed and heated air from the compressor 244 mixes at a mixing point with the recirculation air D2 provided by the fan 280 through the valve V6 to produce mixed air. The mixing point in this case can be referred to as downstream of the compressor 244 and/or upstream of the heat exchanger 220. When applied to an air conditioning pack, the mixing point can be referred to as inside the pack. The mixed air enters the heat exchanger 220, where it is cooled by ram air to the temperature required by the chamber 202 to produce cool air. The cool air then goes directly into the chamber 202 via the valve V5. Further, the cabin discharge air D1 is used to provide the energy to pressurize the bleed air entering the compressor 244. That is, the chamber discharge air D1 flowing from the chamber 202 through the valve V4 enters and expands across the turbine 245, so that work is extracted. The amount of work extracted by the turbine 245 is enough to turn the air cycle machine 240 at the speed required by the compressor 244 to raise a pressure of the bleed air to a value that can drive the bleed air through the heat exchanger 220 and into the chamber 202.

The boost pressure mode can be used at flight conditions where the pressure of the bleed air entering the air cycle machine 240 is as low as 2.5 psi below the chamber pressure (e.g., conditions at cruise where altitudes are above 30,000 ft. and conditions at or near standard ambient day types).

Figure 4:
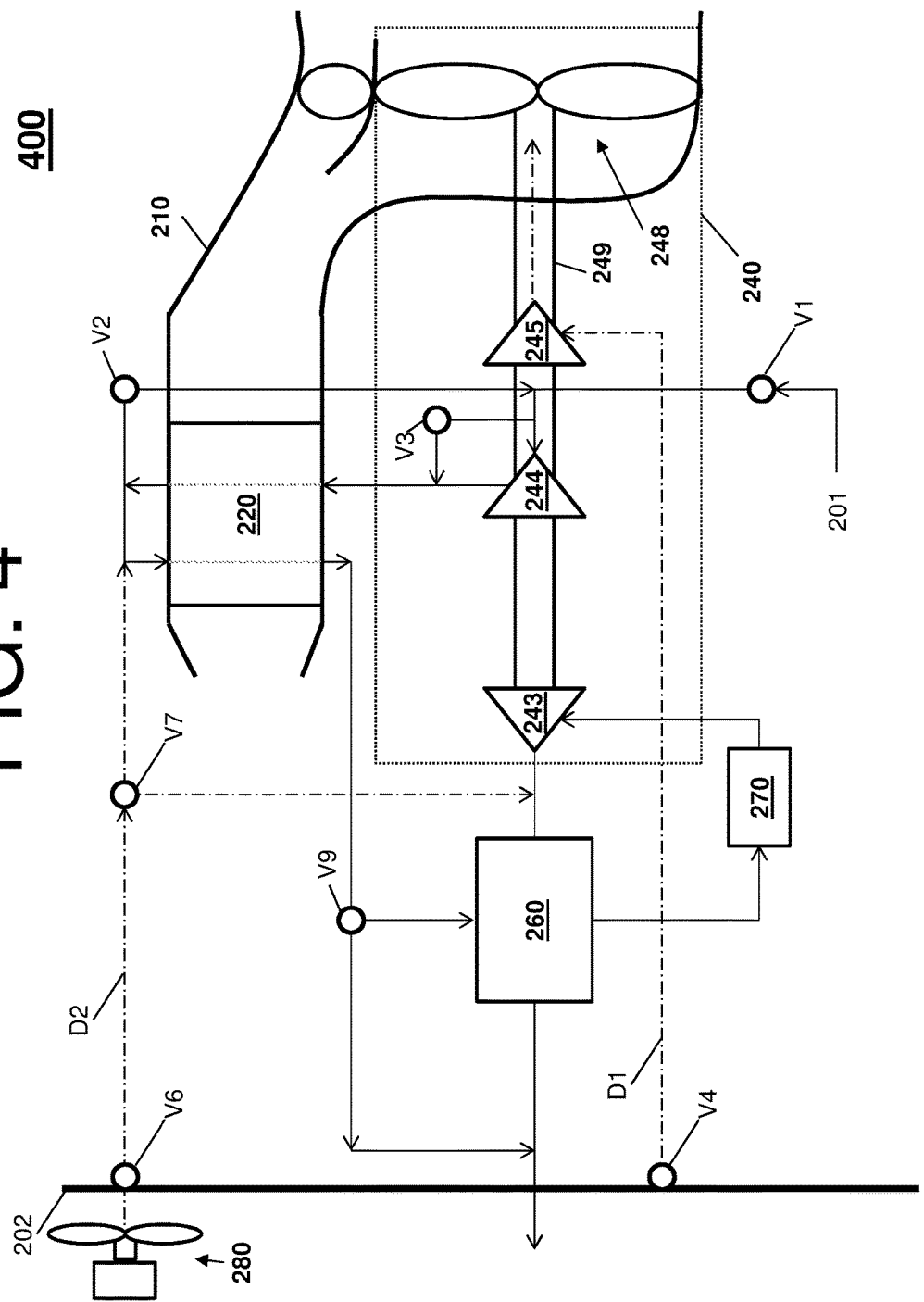
FIG. 4 is operation example of an environmental control system according to another embodiment.

The system 100 of FIG. 1A will now be described with reference to FIG. 4, in view of the aircraft example. FIG. 4 depicts a schematic of a system 400 (e.g., an embodiment of system 100) as it could be installed on an aircraft. Components of the system 300 that are similar to the system 200 and system 300 have been reused for ease of explanation, by using the same identifiers, and are not re-introduced. An alternative component of the system 400 is a valve V9, along with the alternative paths depicted.

In a high pressure mode of operation, high-pressure high-temperature air is received from the inlet 201 through the valve V1. The high-pressure high-temperature air enters the compressor 244. The compressor 244 pressurizes the high-pressure high-temperature and in the process heats it. This air then enters a first pass of the heat exchanger 220 and is cooled by ram air. The air exiting the first pass of the heat exchanger 220 then enters the second pass of the heat exchanger 220 and is further cooled to produce cool high pressure air. This cool high pressure air enters through the valve V9 the condenser 260 and the water extractor 270, where the air is cooled and the moisture removed. The cool high pressure air enters the turbine 243, where it is expanded and work extracted. The work from the turbine 243 can drive both the compressor 244 and the fan 248. The fan 248 is used to pull ram air flow through the heat exchanger 220. Also, by expanding and extracting work, the turbine 243 produces cold bleed air. After leaving the turbine 243, the cold bleed air is mixed at a mixing point with the recirculation air D2 provided by the fan 280 through the valves V6 and V7. The mixing point in this case can be referred to as downstream of the compressing device 240, downstream of the compressor 244, downstream of the turbine 243, and/or upstream a low pressure side of the condenser 260. When applied to an air conditioning pack, the mixing point can be referred to as inside the pack. By mixing the cold bleed air with the recirculation air, the system 200 utilizes the recirculation air, which is warm and moist, to level out the cold bleed air (e.g., raise the temperature). This leveled out bleed air, in turn, enters the low pressure side of the condenser 260, cools the bleed air on the high pressure side of the condenser 260, and is sent to condition the chamber 202.

When operating in the high pressure mode, it is possible for the air leaving the compressor 244 to exceed an auto-ignition temperature of fuel (e.g., 400 F for steady state and 450 F for transient). In this situation, air from an outlet of the first pass of the heat exchanger 220 is ducted by the valve V2 to an inlet of the compressor 244. This lowers an inlet temperature of the air entering the inlet of the compressor 244 and, as a result, the air leaving the compressor 244 is below the auto-ignition temperature of fuel.

The high pressure mode of operation can be used at flight conditions when engine pressure is adequate to drive the cycle or when a temperature of the chamber 202 demands it. For example, conditions, such as ground idle, taxi, take-off, climb, and hold conditions would have the air cycle machine 240 operating in the high pressure mode. In addition, extreme temperature high altitude cruise conditions could result in the air cycle machine 240 operating in the high pressure mode.

In a low pressure mode of operation, the bleed air from the inlet 201 bypasses the air cycle machine 240 via the valve V3 and goes directly through the first pass of the heat exchanger 220. Upon exiting the first pass, the bleed air then mixes at a mixing point with the recirculation air D2 provided by the fan 280 through the valves V6, V7 to produce mixed air. The mixing point in this case can be referred to as downstream of the compressor 244 and/or upstream of the second pass of the heat exchanger 220. When applied to an air conditioning pack, the mixing point can be referred to as inside the pack. The mixed air enters the second pass of the heat exchanger 220, where it is cooled by ram air to the temperature required by the chamber 202 to produce cool air. The cool air then goes directly into the chamber 202 via the valve V9. Further, the chamber discharge air D1 is used to keep the air cycle machine 240 turning at a minimum speed. That is, the chamber discharge air D1 flowing from the chamber 202 through the valve V4 enters and expands across the turbine 245, so that work is extracted. This work is utilized to turn the air cycle machine 240 at, for example, a minimum speed of approximately 6000 rpm. The air exiting the turbine 245 is then dumped overboard through the shell 210.

The low pressure mode can be used at flight conditions where the pressure of the bleed air entering the air cycle machine 240 is greater than approximately 1 psi above the chamber pressure (e.g., conditions at cruise where altitudes are above 30,000 ft. and conditions at or near standard ambient day types).

In a boost pressure mode of operation, the bleed air from the inlet 201 enters the compressor 244, where it is compressed and heated. The compressed and heated air from the compressor 244 passes through the first pass of the heat exchanger 220 and then mixes at a mixing point with the recirculation air D2 provided by the fan 280 through the valves V6, V7 to produce mixed air. The mixing point in this case can be referred to as downstream of the compressor 244 and/or upstream of the second pass of the heat exchanger 220. When applied to an air conditioning pack, the mixing point can be referred to as inside the pack. The mixed air enters the second pass of the heat exchanger 220, where it is cooled by ram air to the temperature required by the chamber 202 to produce cool air. The cool air then goes directly into the chamber 202 via the valve V9. Further, the cabin discharge air D1 is used to provide the energy to pressurize the bleed air entering the compressor 244. That is, the chamber discharge air D1 flowing from the chamber 202 through the valves V4 enters and expands across the turbine 245, so that work is extracted. The amount of work extracted by the turbine 245 is enough to turn the air cycle machine 240 at the speed required by the compressor 244 to raise a pressure of the bleed air to value that can drive the bleed air through the heat exchanger 220 and into the chamber 202.

The boost pressure mode can be used at flight conditions where the pressure of the bleed air entering the air cycle machine 240 is as low as 2.5 psi below the chamber pressure (e.g., conditions at cruise where altitudes are above 30,000 ft. and conditions at or near standard ambient day types).

Figure 5:
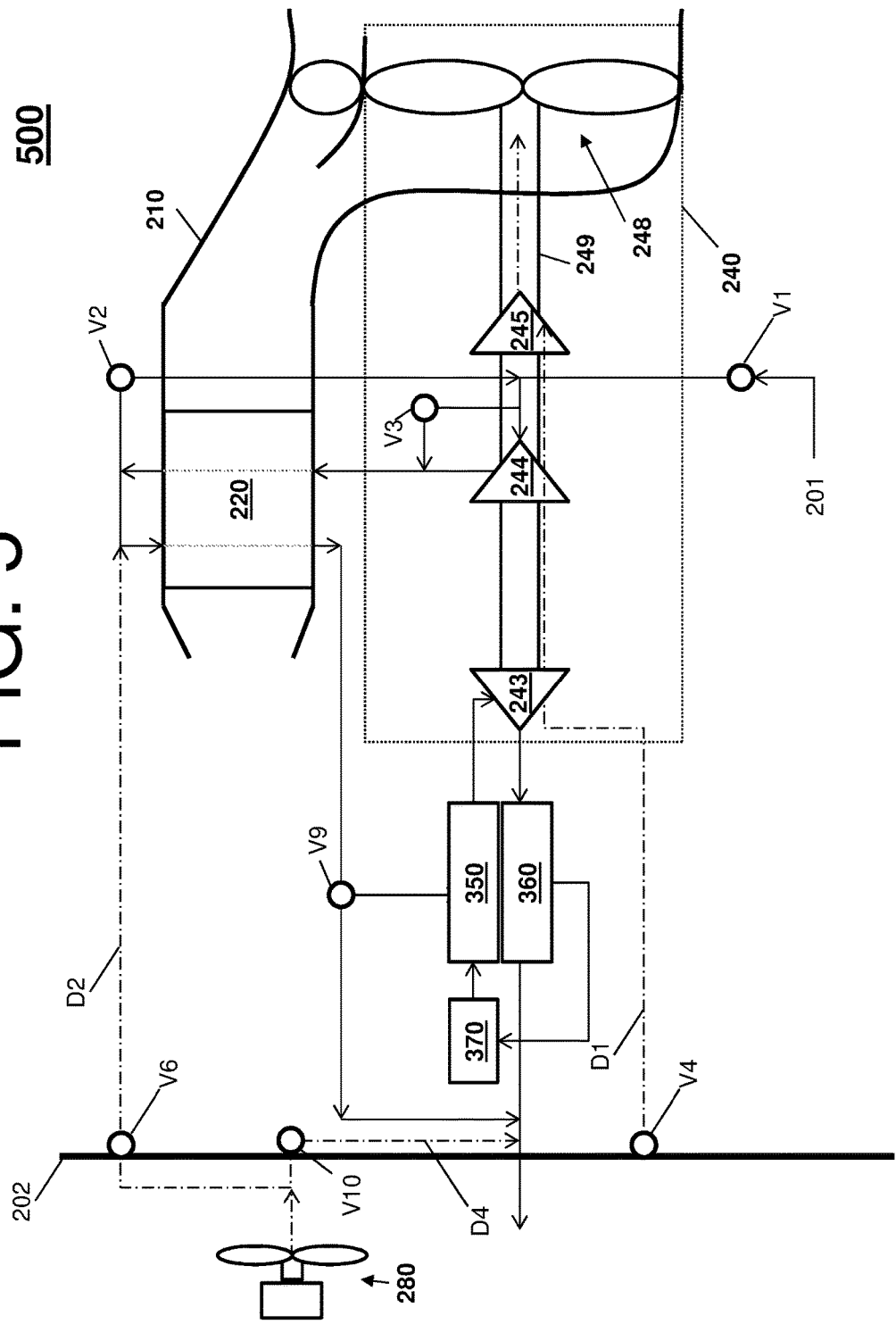
FIG. 5 is operation example of an environmental control system according to another embodiment.

The system 100 of FIG. 1A will now be described with reference to FIG. 5, in view of the aircraft example. FIG. 5 depicts a schematic of a system 500 (e.g., an embodiment of system 100) as it could be installed on an aircraft. Components of the system 500 that are similar to the systems 200, 300, and 400 have been reused for ease of explanation, by using the same identifiers, and are not re-introduced. An alternative component of the system 500 is a valve V10, along with the alternative paths depicted by the dot-dashed line D4.

In a high pressure mode of operation, high-pressure high-temperature air is received from the inlet 201 through the valve V1. The high-pressure high-temperature air enters the compressor 244. The compressor 244 pressurizes the high-pressure high-temperature and in the process heats it. This air then enters a first pass of the heat exchanger 220 and is cooled by ram air. The air exiting the first pass of the heat exchanger 220 then enters the second pass of the heat exchanger 220 and is further cooled to produce cool high pressure air. This cool high pressure air enters through the valve V9 into the reheater 350, where it is cooled; through the condenser 360, where it is cooled by air from the turbine 243; through the water extractor 370, where the moisture in the air is removed; and again into the reheater 350, where the air is heated to nearly an inlet temperature at the valve V9. The warm high pressure and now dry air enters the turbine 243, where it is expanded and work extracted. The work from the turbine 243 can drive both the compressor 244 and the fan 248. The fan 248 is used to pull ram air flow through the heat exchanger 220. After leaving the turbine 243, the cold air, typically below freezing, cools the warm moist air in the condenser 360. Downstream of the condenser 360, the cold air leaving the air cycle machine 240 mixes at a mixing point with the recirculation air D4 provided by the fan 280 through the valve V10 to produce mixed air. The mixing point in this case can be referred to as downstream of the compressing device 240, downstream of the compressor 244, and/or downstream of the turbine 243. When applied to an air conditioning pack, the mixing point can be referred to as outside the pack. This mixed air then sent to condition the chamber 202.

When operating in the high pressure mode, it is possible for the air leaving the compressor 244 to exceed an auto-ignition temperature of fuel (e.g., 400 F for steady state and 450 F for transient). In this situation, air from an outlet of the first pass of the heat exchanger 220 is ducted by the valve V2 to an inlet of the compressor 244. This lowers an inlet temperature of the air entering the inlet of the compressor 244 and, as a result, the air leaving the compressor 244 is below the auto-ignition temperature of fuel.

The high pressure mode of operation can be used at flight conditions when engine pressure is adequate to drive the cycle or when a temperature of the chamber 202 demands it. For example, conditions, such as ground idle, taxi, take-off, climb, and hold conditions would have the air cycle machine 240 operating in the high pressure mode. In addition, extreme temperature high altitude cruise conditions could result in the air cycle machine 240 operating in the high pressure mode.

In a low pressure mode of operation, the bleed air from the inlet 201 bypasses the air cycle machine 240 via the valve V3 and goes directly through the first pass of the heat exchanger 220. Upon exiting the first pass, the bleed air then mixes at a mixing point with the recirculation air D2 provided by the fan 280 through the valves V6, V10 to produce mixed air. The mixing point in this case can be referred to as downstream of the compressor 244 and/or upstream of the second pass of the heat exchanger 220. When applied to an air conditioning pack, the mixing point can be referred to as inside the pack. The mixed air enters the second pass of the heat exchanger 220, where it is cooled by ram air to the temperature required by the chamber 202 to produce cool air. The cool air then goes directly into the chamber 202 via the valve V9. Further, the chamber discharge air D1 is used to keep the air cycle machine 240 turning at a minimum speed. That is, the chamber discharge air D1 flowing from the chamber 202 through the valve V4 enters and expands across the turbine 245, so that work is extracted. This work is utilized to turn the air cycle machine 240 at, for example, a minimum speed of approximately 6000 rpm. The air exiting the turbine 245 is then dumped overboard through the shell 210.

The low pressure mode can be used at flight conditions where the pressure of the bleed air entering the air cycle machine 240 is greater than approximately 1 psi above the chamber pressure (e.g., conditions at cruise where altitudes are above 30,000 ft. and conditions at or near standard ambient day types).

In a boost pressure mode of operation, the bleed air from the inlet 201 enters the compressor 244, where it is compressed and heated. The compressed and heated air from the compressor 244 passes through the first pass of the heat exchanger 220 and then mixes at a mixing point with the recirculation air D2 provided by the fan 280 through the valve V6 to produce mixed air. The mixing point in this case can be referred to as downstream of the compressor 244 and/or upstream of the second pass of the heat exchanger 220. When applied to an air conditioning pack, the mixing point can be referred to as inside the pack. The mixed air enters the second pass of the heat exchanger 220, where it is cooled by ram air to the temperature required by the chamber 202 to produce cool air. The cool air then goes directly into the chamber 202 via the valve V9. Further, the cabin discharge air D1 is used to provide the energy to pressurize the bleed air entering the compressor 244. That is, the chamber discharge air D1 flowing from the chamber 202 through the valves V4 enters and expands across the turbine 245, so that work is extracted. The amount of work extracted by the turbine 245 is enough to turn the air cycle machine 240 at the speed required by the compressor 244 to raise a pressure of the bleed air to value that can drive the bleed air through the heat exchanger 220 and into the chamber 202.

The boost pressure mode can be used at flight conditions where the pressure of the bleed air entering the air cycle machine 240 is as low as 2.5 psi below the chamber pressure (e.g., conditions at cruise where altitudes are above 30,000 ft. and conditions at or near standard ambient day types).

In another embodiment, an environmental control system can operate in a multiple point mixing mode. The multiple point mixing mode, in general, mixes the first and second mediums (e.g., bleed air and recirculation air) at multiple points within the environmental control system. That is, during non-multiple point mixing mode operations, the amount of recirculation flow going to, e.g., the heat exchanger 220 can be 100%. Further, during the multiple point mixing mode operations, the amount of recirculation flow going to, e.g., the heat exchanger 220 can be less than 100% and the remaining amount of flow can proceed to another part of the environmental control system. In embodiments of the multiple point mixing mode, a first portion flowing to the heat exchange 220 can be selected from a range of 50%-100% and a second portion flowing to another part of the environmental control system can be a balance of the percentage (e.g., 90/10 spilt; 80/20 spilt; 70/30 spilt; 60/40 spilt). The environmental control system can utilize the multiple point mixing mode, when at altitude while ram flow is not a desired temperature (e.g., too hot for proper cooling across the heat exchanger 220).

For example, when the environmental control system is operating in the multiple point mixing mode, the first and second mediums can be mixed at two or more points. Note that the systems 200, 300, 400, 500 of FIGS. 2-5 can operate in the multiple point mixing mode. For instance, when any of the systems 200, 300, 400, 500 are operating in a low pressure mode or boost pressure mode, that system 200, 300, 400, 500 can also operate in the multiple point mixing mode.

For example, with respect to system 200 operating in the multiple point mixing mode while in either the low pressure mode or the boost pressure mode, the recirculation air flowing from the fan 280 can be divided by the valve V7, such that a first portion of the recirculation air flow proceeds to mix downstream of the compressor 244 (e.g., mix with bleed air to produce a combined air) and a second portion of the recirculation air flow proceeds to downstream of the turbine 243. The second portion can then pass through the condenser 260 and mix with the combined air flowing through valve V5. Further, with respect to the system 400 operating in the multiple point mixing mode while in either the low pressure mode or the boost pressure mode, the recirculation air flowing from the valve V6 can be divided by the valve V7, such that a first portion of the recirculation air flow proceeds to mix downstream of the compressor 244 and before a second pass of the heat exchanger 220 (e.g., mix with bleed air to produce a combined air) and a second portion of the recirculation air flow proceeds to downstream of the turbine 243. The second portion can then pass through the condenser 260 and mix with the combined air flowing through valve V9.

For example, with respect to system 300 operating in the multiple point mixing mode while in either the low pressure mode or the boost pressure mode, the recirculation air flowing from the fan 280 can be divided by the valves V6 and V8, such that a first portion of the recirculation air flow proceeds through the valve V6 to mix downstream of the compressor 244 (e.g., mix with bleed air to produce a combined air) and a second portion of the recirculation air flow proceeds through the valve V8 to downstream of the turbine 243. The second portion can then mix with the combined air flowing through valve V5. Note that the valves V6 and V8 can be a plurality of valves working together as shown or as a single valve. Further, with respect to the system 500 operating in the multiple point mixing mode while in either the low pressure mode or the boost pressure mode, the recirculation air flowing from the fan 280 can be divided by the valves V6 and V10, such that a first portion of the recirculation air flow proceeds through the valve V6 to mix downstream of the compressor 244 and before a second pass of the heat exchanger 220 (e.g., mix with bleed air to produce a combined air) and a second portion of the recirculation air flow proceeds through the valve V10 to downstream of the turbine 243. The second portion can then mix with the combined air flowing through valve V9. Note that the valves V6 and V10 can be a plurality of valves working together as shown or as a single valve.

Aspects of the embodiments are described herein with reference to flowchart illustrations, schematics, and/or block diagrams of methods, apparatus, and/or systems according to embodiments of the invention. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system, comprising:
   an air conditioning pack comprising at least one turbine, at least one heat exchanger, and at least one flow regulation device;
   a first medium flow received from an inlet and provided to a chamber;
   a second medium flow received from the chamber;
   a first mixing point configured to mix the first medium flow with the second medium flow to produce a combined flow, the first mixing point located inside the air conditioning pack at an exit of the at least one turbine; and
   a second mixing point configured to mix the first medium flow with the second medium flow to produce the combined flow, the second mixing point located inside the air conditioning pack prior to the at least one turbine so that an inlet of the at least one turbine receives the combined flow,
   wherein the system is configured to operate in a first mode or a second mode, the first mode comprising when the system mixes the first and second medium flows at the first mixing point, and the second mode comprising when the system mixes the first and second medium flows at the second mixing point.

2. The system of claim 1, wherein the second mixing point is downstream of the at least one flow regulation device.

3. The system of claim 2, wherein the second mixing point is upstream of the at least one heat exchanger.

4. The system of claim 3, wherein the at least one heat exchanger is a primary heat exchanger.

5. The system of claim 3, wherein the at least one heat exchanger is a secondary heat exchanger.

6. The system of claim 3, wherein the at least one heat exchanger comprises a plurality of passes.

7. The system of claim 6, wherein the second mixing point is downstream of a first pass of the plurality of passes.

8. A system, comprising:
   an air conditioning pack comprising at least one turbine, at least one heat exchanger, and at least one flow regulation device;
   a first medium flow received from an inlet and provided to a chamber;
   a second medium flow received from the chamber;
   a first mixing point located inside the air conditioning pack and configured to mix the first medium flow with the second medium flow, wherein the first mixing point is downstream of the at least one turbine;
   a second mixing point located inside the air conditioning pack and configured to mix the first medium flow with the second medium flow, wherein the second mixing point is upstream of the at least one turbine,
   wherein the system is configured to operate in a first mode or a second mode, the first mode comprising when the system mixes the first and second medium flows at the first mixing point, and the second mode comprising when the system mixes the first and second medium flows at the second mixing point.

9. The system of claim 8, wherein the second mixing point is upstream of the at least one heat exchanger.

10. The system of claim 8, wherein the at least one heat exchanger comprises a plurality of passes.

11. The system of claim 10, wherein the second mixing point is downstream of a first pass of the plurality of passes.

* * * * *